(12) United States Patent
Park et al.

(10) Patent No.: US 8,428,144 B2
(45) Date of Patent: *Apr. 23, 2013

(54) METHOD AND APPARATUS FOR DECODING/ENCODING OF A VIDEO SIGNAL

(75) Inventors: Seung Wook Park, Seoul (KR); Byeong Moon Jeon, Seoul (KR); Ji Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 792 days.

This patent is subject to a terminal disclaimer.

(21) Appl. No.: 12/223,697

(22) PCT Filed: Sep. 7, 2007

(86) PCT No.: PCT/KR2007/004351
§ 371 (c)(1),
(2), (4) Date: Aug. 7, 2008

(87) PCT Pub. No.: WO2008/030068
PCT Pub. Date: Mar. 13, 2008

(65) Prior Publication Data
US 2009/0220010 A1 Sep. 3, 2009

Related U.S. Application Data

(60) Provisional application No. 60/842,661, filed on Sep. 7, 2006, provisional application No. 60/857,802, filed on Nov. 9, 2006, provisional application No. 60/858,957, filed on Nov. 15, 2006, provisional application No. 60/859,532, filed on Nov. 17, 2006.

(51) Int. Cl.
*H04N 7/12* (2006.01)
*H04N 11/02* (2006.01)
*H04N 11/04* (2006.01)

(52) U.S. Cl.
USPC ............. 375/240.25; 348/14.13; 348/394.1; 348/395.1; 348/403.1; 382/196; 382/233; 382/238; 382/248; 375/240.12; 375/240.13; 375/240.14; 375/240.18

(58) Field of Classification Search ....... 375/240.01–240.29; 348/384.1–440.1; 382/196, 232–253
See application file for complete search history.

(56) References Cited

U.S. PATENT DOCUMENTS 5,754,240 A 5/1998 Wilson
6,043,846 A 3/2000 Shen et al.
(Continued)

FOREIGN PATENT DOCUMENTS

CN 1650348 A 8/2005
CN 1652610 8/2005
(Continued)

OTHER PUBLICATIONS

European Search Report dated Dec. 10, 2009 for corresponding Application No. 07833958.7.
(Continued)

*Primary Examiner* — Sath V Perungavoor
*Assistant Examiner* — Nathnael Aynalem
(74) *Attorney, Agent, or Firm* — Harness, Dickey & Pierce, P.L.C.

(57) ABSTRACT

A method of decoding a video signal is disclosed. The present invention includes determining whether to store a first partial picture when the first partial picture and a first full picture are corresponding to a first temporal point and storing the first partial picture for decoding a second full picture referring to the first partial picture, the second full picture being corresponding to a second temporal point, the second temporal point being located after the first temporal point, wherein a level of the first partial picture on a scalable domain is lower than a level of the second full picture on the scalable domain.

10 Claims, 11 Drawing Sheets

U.S. PATENT DOCUMENTS

| | | | |
|---|---|---|---|
| 6,816,194 B2 | 11/2004 | Zhang et al. | |
| 6,944,222 B2* | 9/2005 | Van Der Schaar | 375/240.12 |
| 7,535,383 B2 | 5/2009 | Segall et al. | |
| 7,643,560 B2 | 1/2010 | Hong et al. | |
| 7,742,524 B2 | 6/2010 | Jeon et al. | |
| 7,746,933 B2 | 6/2010 | Park et al. | |
| 7,787,540 B2 | 8/2010 | Park et al. | |
| 7,864,841 B2 | 1/2011 | Park et al. | |
| 2002/0159518 A1 | 10/2002 | Bottreau et al. | |
| 2005/0025368 A1 | 2/2005 | Glukhovsky | |
| 2005/0123055 A1* | 6/2005 | Winger | 375/240.25 |
| 2005/0195900 A1 | 9/2005 | Han | |
| 2005/0259729 A1 | 11/2005 | Sun | |
| 2006/0008003 A1 | 1/2006 | Ji et al. | |
| 2006/0013302 A1 | 1/2006 | Bao et al. | |
| 2006/0013313 A1 | 1/2006 | Han et al. | |
| 2006/0126962 A1 | 6/2006 | Sun | |
| 2006/0133484 A1 | 6/2006 | Park et al. | |
| 2006/0153295 A1 | 7/2006 | Wang et al. | |
| 2006/0159359 A1 | 7/2006 | Lee | |
| 2006/0165304 A1 | 7/2006 | Lee et al. | |
| 2006/0209959 A1 | 9/2006 | Sun | |
| 2006/0222067 A1 | 10/2006 | Park et al. | |
| 2006/0233249 A1 | 10/2006 | Park et al. | |
| 2006/0233254 A1 | 10/2006 | Lee et al. | |
| 2006/0245498 A1 | 11/2006 | Lee et al. | |
| 2006/0256863 A1 | 11/2006 | Wang et al. | |
| 2007/0014348 A1 | 1/2007 | Bao et al. | |
| 2007/0014362 A1 | 1/2007 | Cruz et al. | |
| 2007/0030911 A1* | 2/2007 | Yoon | 375/240.25 |
| 2007/0047648 A1 | 3/2007 | Tourapis et al. | |
| 2007/0160133 A1 | 7/2007 | Bao et al. | |
| 2007/0160137 A1 | 7/2007 | Guo et al. | |
| 2007/0223575 A1* | 9/2007 | Wang et al. | 375/240.1 |
| 2007/0230575 A1 | 10/2007 | Han | |
| 2008/0024513 A1 | 1/2008 | Raveendran | |
| 2008/0069247 A1 | 3/2008 | He | |
| 2008/0101470 A1 | 5/2008 | Hong et al. | |
| 2008/0137753 A1 | 6/2008 | He | |
| 2008/0267291 A1 | 10/2008 | Vieron et al. | |
| 2009/0028245 A1 | 1/2009 | Vieron et al. | |
| 2009/0060040 A1 | 3/2009 | Jeon et al. | |
| 2009/0185616 A1* | 7/2009 | Pandit et al. | 375/240.01 |
| 2009/0257664 A1 | 10/2009 | Kao et al. | |
| 2010/0158135 A1* | 6/2010 | Yin et al. | 375/240.26 |
| 2010/0208799 A1 | 8/2010 | Park et al. | |

FOREIGN PATENT DOCUMENTS

| | | |
|---|---|---|
| CN | 1659794 | 8/2005 |
| EP | 0644698 | 9/1994 |
| JP | 07079436 | 3/1995 |
| JP | 09102954 | 4/1997 |
| JP | 10276437 | 10/1998 |
| JP | 2004-289745 | 10/2004 |
| JP | 2005-192219 | 7/2005 |
| JP | 2008-538057 | 10/2008 |
| KR | 10-2006-006183 | 1/2006 |
| KR | 10-2006-0103226 A | 9/2006 |
| KR | 10-2006-0131718 | 12/2006 |
| RU | 2128405 | 3/1999 |
| RU | 2201654 | 3/2003 |
| RU | 2365062 | 8/2009 |
| TW | 200623886 | 7/2006 |
| TW | 200629883 | 8/2006 |
| WO | WO-2006008605 A1 | 1/2006 |
| WO | WO 2006/044370 A1 | 4/2006 |
| WO | WO 2006/078142 A1 | 7/2006 |
| WO | WO 2006/087314 | 8/2006 |
| WO | WO 2006/101682 | 9/2006 |
| WO | WO 2006/108863 | 10/2006 |
| WO | WO 2007/115129 A1 | 10/2007 |
| WO | WO 2008/056959 | 5/2008 |

OTHER PUBLICATIONS

European Search Report dated Dec. 14, 2009 for corresponding Application No. 07834114.6.

European Search Report dated Dec. 14, 2009 for corresponding Application No. 07834118.7.

Francois, E. et al.: "Prop. 1 for CE10 Generic Ext. Spat. SVC" Joint Video Team (JVT) of ISO/IEC MPEG & ITU-T VCEG (ISO/IEC JTC1/SC29/WG11 and ITU-T SG16 Q6), No. JVT-o041r1, Apr. 14, 2005, pp. 1-36.

"Joint Scalable Video Model (JSVM) 7 (Jun. 10, 2006)" Joint Video Team (JVT) of ISO/IEC MPEG & ITU-T VCEG (ISO/IEC JTC1/SC29/WG11 and ITU-T SG16 Q.6), No. JVT-T202, Oct. 20, 2006, XP 030006634.

"JVSM Software Manual, JVSM 6.1", Joint Video Team (JVT) of ISO/IEC MPEG & ITU-T VCEG, Jul. 24, 2006, pp. 1-63.

Wang, Ye-Kui et al.: "System and Transport Interface of H.264/AVC Scalable Extension" IMAG E Processing, 2006 IEEE International Conference on, IEEE PI, Oct. 1, 2006, pp. 165-168.

Wiegand, Thomas et al.: "Overview of the H.264/AVC video coding standard " IEEE Transactions on Circuits and Systems for Video Technology, IEEE Service Center, Piscataway, NJ, US, vol. 13, No. 7, Jul. 1, 2003, pp. 560-576.

Park, Seung-Wook, et al.: "Usage of store_base_rep_flag" Joint Video Team (JVT) of ISO/IEC MPEG & ITU-T VCEG (ISO/IEC JTC1/SC29/WG11 and ITU-T SG16 Q.6)No. JVT-U090, Oct. 20, 2006, pp. 1-6.

Office Action issued Dec. 17, 2008 by the Korean Intellectual Property Office for counterpart Korean Patent Application No. 10-2008-7017970.

Notice of Allowance issued Apr. 17, 2009 by the Korean Patent Office in counterpart Korean Patent Application No. 10-2008-7017970.

Chinese Office Action dated Feb. 12, 2010 for corresponding Application No. 2007/80008342.6. (with English translation).

JSVM Software Manual, JSVM 6.8.2.

S. Sun et al., "Extended Spatial Scalability with Picture-Level Adaptation," Joint Video Team (JVT) of ISO/IEC MPEG & ITU-T VCEG (ISO/IEC JTC1/SC29/WG11 and ITU-T SG16 Q.6), 15$^{th}$ Meeting: Busan, KR, Apr. 16-22, 2005, pp. 1-21.

Office Action issued Apr. 28, 2009 by the Russian Patent Office in counterpart Russian Patent Application No. 2008138072 (with English language translation).

Australian Notice of Allowance dated Jun. 18, 2010 in AU Application No. 2007318376.

T. Weigand et al, "Joint Scalable Video Model JSVM-8" Joint Video Team (JVT) of ISO/IEC MPEG&ITU-T VCEG (ISO/IEC JTC1/SC29/WG11 and ITU-T SG16 Q.6) JVT U202, Oct. 20, 2006.

International Search Report issued Mar. 12, 2008 in counterpart International Patent Application No. PCT/KR2007/005813.

International Search Report issued Mar. 12, 2008 in counterpart International Patent Application No. PCT/KR2007/005812.

International Search Report issued Mar. 6, 2008 in counterpart International Patent Application No. PCT/KR2007/005808.

International Search Reportissued Feb. 5, 2008 in counterpart International Application No. PCT/KR2007/005651.

European Office Action dated Jan. 27, 2011 issued in corresponding European Application No. 07833958.7.

Various Authors, "Joint Draft 10 of SVC Amendment", Document JVT-W201 of the Joint Video Team (JVT) of ISO/IEC MPEG & ITU-T VCEG, XP030007140, Jul. 3, 2007.

Various Authors, "Joint Draft 8 of SVC Amendment", Document JVT-U201 of the Joint Video Team (JVT) of ISO/IEC MPEG & ITU-T VCEG, XP030006798, Nov. 14, 2006.

Chinese Office Action dated Mar. 1, 2010 for corresponding Application No. 2007/80008103.0.

Notice of Allowance for U.S. Appl. No. 12/223,823 dated Mar. 2, 2010.

Notice of Allowance for U.S. Appl. No. 12/223,819 dated Mar. 25, 2010.

Taiwanese Office Action dated Jul. 26, 2011 issued in corresponding Taiwanese Application No. 096143802.

U.S. Office Action dated Feb. 25, 2011 issued in corresponding U.S. Appl. No. 12/223,787.

Notice of Allowance issued May 8, 2009 by the Korean Patent Office in counterpart Korean Patent Application No. 10-2008-7017973.

Japanese Office Action dated May 18, 2011 issued in corresponding Japanese Application No. 2009-514215.

Wiegand, T., et al., Joint Scalable Video Model 8: Joint Draft 8 with proposed changes, Joint Video Team (JVT) of ISO/IEC MPEG & ITU-T VCEG (ISO/IEC JTC1/SC29/WG11 and ITU-T SG16 Q.6) JVT-U202_AnnexG, Oct. 26, 2006, pp. 377-382 (URL: http://wftp3.itu.int/av-arch/jvt-site/2006_10_Hangzhou/JVT-U202.zip).

Russian Notice of Allowance dated Oct. 28, 2009 for corresponding Application No. 2008138072.

Joint Video Team (JVT) of ISO/IEC MPEG&ITU-T VCEG, JVT-O202 AnnexS, Scalable Video Coding—Working Draft 2, 15th Meeting: Busan, Apr. 16-22, 2005.

USPTO Office Action dated Dec. 4, 2009 for corresponding U.S. Appl. No. 12/223,819.

USPTO Office Action dated Dec. 4, 2009 for corresponding U.S. Appl. No. 12/223,823.

European Office Action dated Aug. 30, 2010 issued in corresponding European application No. 07834118.7.

AAVV: "Joint Draft 9 of SVC Amendment", Joint Video Team (JVT) of ISO/IEC MPEG & ITU-T VCEG, Document JVT-V201, pp. 1-482, Draft ISO/IEC 14496-10 (2006).

M. M. Hannuksela, et al.: "Support for SVC Header Rewriting to AVC", Joint Video Team (JVT) of ISO/IEC MPEG & ITU-T VCEG. Document JVT-W046, pp. 1-11, Apr. 2007.

Notice of Allowance for corresponding U.S. Appl. No. 12/659,253 dated Jan. 26, 2012.

Kimoto, Takahiro. "Activity on Scalable Video Coding in MPEG," 2005. (English Abstract, p. 5).

Rao, K.R. et al. "Table 11.1 Function Comparison Between MPEG-1 Video and MPEG-2 Video." (English translation, pp. 203-204).

"International Telecommunication Union, White Book, ITU-T SG 15," Geneva, Feb. 6-17, 1995 (English translation, pp. 308, 385, 545, 546).

Kodama, Mei et al. "A Consideration on Video Information Architectures for Multimedia Scalability Packages Communication Services," 1998. (English Abstract, p. 4).

"MPEG-4 H.264," (English translation, pp. 113, 114, 124, 125).

"wftp.itu.int—/av-arch/jvt-site/2007_06_Geneva/", 2007.

Wiegand, Thomas et al. "Joint Draft ITU-T Rec. H. 264 ISO/IEC 14496-10/Amd. 3 Scalable video coding," Joint Video Team (JVT) of ISO/IEC MPEG & ITU VCEG (ISO/IEC JTC1/SC29A/WG11 and ITU-T SG 16 Q.6) Document: JVT-X201, Oct. 26, 2007.

"MPEG," (English translation, pp. 148-149).

Taiwanese Office Action dated Sep. 2, 2011 issued in corresponding Taiwanese Application No. 096142777.

U.S. Office Action dated Sep. 13, 2011 issued in corresponding U.S. Appl. No. 12/659,253.

Taiwanese Office Action dated Jan. 10, 2012 issued in corresponding Taiwanese Appln. No. 096133777.

Thomas Wiegand, et. Al., "Joint Draft ITU-T Rec. H.264 I ISO/IEC 14496-10/Amd. 3 Scalable video coding", [online], Oct. 26, 2007, Joint Video Team (JVT) of ISO/IEC MPEG & ITU-T VCEG (ISO/IEC JTC1/SC29/WG11 and ITU-T SG16 Q.6) Document: JVT-X201 <<URL:http://wftp3.itu.int/av-arch/jvt-site/2007_06_Geneva/JVT-X201.zip>>.

"wftp3.itu.int—/av-arch/jvt-site/2007_06_Geneva/", [online], URL:http://wftp3.itu.int/av-arch/jvt-site/2007_06_Geneva/.

Office Action for corresponding U.S. Appl. No. 12/223,696 dated Mar. 14, 2012.

\* cited by examiner

FIG. 5

| | slice_header_in_scalable_extension( ) { |
|---|---|
| | ⋮ |
| S510 | if( quality_id = = 0 ) { |
| | ⋮ |
| | } |
| S520 | if( nal_ref_idc != 0 ) { |
| S530 | dec_ref_pic_marking( ) |
| S540 | if( !slice_header_restriction_flag ) { |
| S550 | store_ref_base_pic_flag |
| S560 | if ( ( use_ref_base_pic_flag \|\| store_ref_base_pic_flag ) && !idr_flag ) |
| S570 | dec_ref_base_pic_marking( ) |
| | } |
| | } |
| | ⋮ |

FIG. 6

| prefix_nal_unit_rbsp( ) { | C | Descriptor |
|---|---|---|
| if( nal_ref_idc != 0 ) { | | |
|   store_ref_base_pic_flag | 2 | u(1) |
|   if( ( use_ref_base_pic_flag \|\| store_ref_base_pic_flag ) && !idr_flag ) | | |
|     dec_ref_base_pic_marking( ) | 2 | |
|   … | | |
|   } | | |
| } | | |

FIG. 7

| | | C | Descriptor |
|---|---|---|---|
| S710 | slice_header_in_scalable_extension { | | |
| | …. | | |
| S730 | if ( slice_type == !PR && !layer_base_flag) { | | |
| S750 |   store_base_rep_flag | 1 | u(1) |
| | } | | |
| | …. | | |

FIG. 8

| | nal_unit_header_svc_extension( ) { | C | Descriptor |
|---|---|---|---|
| | .... | | |
| S810 | use_base_prediction_flag | All | u(1) |
| | .... | | |
| | nalUnitHeaderBytes += 3 | | |
| | } | | |

| | slice_layer_in_scalable_extension_rbsp( ) { | C | Descriptor |
|---|---|---|---|
| | .... | | |
| S820 | if ( dependency_id == 0 && quality_level == 0 ) { | | |
| S830 | if ( nal_ref_idc !=0 ) { | | |
| S840 | if ( use_base_prediction_flag ) { | | |
| S850 | store_base_rep_flag } | 1 | u(1) |
| S860 | if ( store_base_rep_flag && nal_unit_type !=21 ) | | |
| S870 | dec_ref_pic_marking_base( ) | | |
| | } | | |
| | .... | | |

| | slice_header_in_scalable_extension { | C | Descriptor |
|---|---|---|---|
| | .... | | |
| S880 | if ( slice_type == PR && fragment_order == 0 && use_base_prediction_flag ) { | | |
| S890 | store_base_rep_flag | 1 | u(1) |
| | } | | |
| | .... | | |

FIG. 9

|  | nal_unit_header_svc_extension( ) { | C | Descriptor |
|---|---|---|---|
|  | .... |  |  |
| S910 | use_base_prediction_flag | All | u(1) |
| S930 | store_base_rep_flag |  |  |
|  | nalUnitHeaderBytes += 3 |  |  |
|  | } |  |  |

FIG. 10

| | nal_unit_header_svc_extension( ) { | C | Descriptor |
|---|---|---|---|
| | …. | | |
| S1010 | use_base_prediction_flag | All | u(1) |
| | …. | | |
| | nalUnitHeaderBytes += 3 | | |
| | } | | |

| | slice_layer_in_scalable_extension_rbsp( ) { | C | Descriptor |
|---|---|---|---|
| | …. | | |
| S1020 | if ( dependency_id == 0 && quality_level == 0 ) { | | |
| S1030 | if ( nal_ref_idc !=0 ) { | | |
| S1040 | store_base_rep_flag | 1 | u(1) |
| S1050 | if ( store_base_rep_flag && nal_unit_type !=21 ) | | |
| S1060 | dec_ref_pic_marking_base( ) | | |
| | } | | |
| | …. | | |

| | slice_header_in_scalable_extension { | C | Descriptor |
|---|---|---|---|
| | …. | | |
| S1070 | if ( slice_type == !PR && !layer_base_flag<br>&& use_base_prediction_flag ) { | | |
| S1080 | store_base_rep_flag | 1 | u(1) |
| | } | | |
| | …. | | |

| slice_header_in_scalable_extension { | C | Descriptor |
|---|---|---|
| .... | | |
| if ( slice_type == !PR | | |
| && use_base_prediction_flag ) { | | |
| store_base_rep_flag | 1 | u(1) |
| } | | |
| .... | | |

(b)

| slice_header_in_scalable_extension { | C | Descriptor |
|---|---|---|
| .... | | |
| if (!layer_base_flag | | |
| && use_base_prediction_flag ) { | | |
| store_base_rep_flag | 1 | u(1) |
| } | | |
| .... | | |

(c)

| slice_header_in_scalable_extension { | C | Descriptor |
|---|---|---|
| .... | | |
| if ( use_base_prediction_flag ) | | |
| store_base_rep_flag | 1 | u(1) |
| } | | |
| .... | | |

FIG. 12

| | slice_header_in_scalable_extension { | C | Descriptor |
|---|---|---|---|
| | .... | | |
| S1210 | if ( slice_type == PR && fragment_order == 0) { | | |
| | .... | | |
| S1230 | if ( use_base_rep_flag && quality_level == 1 ) { | | |
| S1250 | store_base_rep_flag | 1 | u(1) |
| | .... | | |

METHOD AND APPARATUS FOR DECODING/ENCODING OF A VIDEO SIGNAL

CROSS-REFERENCE TO RELATED PATENT APPLICATIONS

This application is a National Phase entry of PCT Application No. PCT/KR2007/004351, filed on Sep. 7, 2007, which claims priority under 35 U.S.C. §119(e), 120 and 365(c) to U.S. Provisional Application No. 60/842,661, filed on Sep. 7, 2006, U.S. Provisional Application No. 60/857,802, filed on Nov. 9, 2006, U.S. Provisional Application No. 60/858,957, filed on Nov. 15, 2006, and U.S. Provisional Application No. 60/859,532, filed on Nov. 17, 2006 in the U.S. Patent and Trademark Office, the contents of each of which are incorporated by reference in its entirety.

BACKGROUND

Compression coding means a series of signal processing techniques for transmitting digitalized information via a communication circuit or storing the digitalized information in a form suitable for a storage medium. As targets of compression coding, there are audio, video, characters, etc. In particular, a technique for performing compression coding on video is called video sequence compression. A video sequence is generally characterized in having spatial redundancy or temporal redundancy.

A scalable video coded bit stream can be selectively decoded in part only. For instance, a decoder having low complexity is capable of decoding a basic layer and a bit stream at a low data rate can be extracted for transmission via a network having a limited capacity. In order to generate images of high resolution more gradually, an image quality of a sequence needs to be raised step by step.

SUMMARY

One of the objects of the present invention is to raise coding efficiency of a video signal.

Accordingly, the present invention is directed to a video signal coding scheme that substantially obviates one or more of the problems due to limitations and disadvantages of the related art.

An object of the present invention is to define a syntax for codec compatibility, by which compatibility between different type codecs can be raised.

Another object of the present invention is to define a syntax for rewriting a scalable video coded bit stream, by which inter-codec compatibility can be raised.

Another object of the present invention is to raise inter-codec compatibility in a manner of restricting a syntax for indicating whether to store a reference base picture at an appropriate position.

Another object of the present invention is to manage a decoded picture buffer efficiently in a manner of defining a syntax for indicating whether to store a reference base picture at an appropriate position.

Another object of the present invention is to perform a decoded picture marking efficiently in a manner of a syntax for indicating whether to store a reference base picture at an appropriate position.

Another object of the present invention is to provide a decoding method, by which a problem rising in a decoding process for a video signal due to an error generated in the course of transmission.

Another object of the present invention is to provide a method of managing a decoded picture buffer by a decoding scheme for minimizing a problem generated from a decoding process of a video signal due to an error generated in the course of transmission.

In coding a video signal, the present invention is able to raise compatibility between different type codecs by defining a syntax for codec compatibility. For instance, a syntax structure for transforming a scalable video coded bit stream into a bit stream coded by AVC codec to raise inter-codec compatibility.

A decoded picture buffer (DPB) is more efficiently managed in using the present invention to reduce a burden imposed on the DPB. Hence, a coding speed can be enhanced.

The present invention, among other things, enables more efficient coding by using various kinds of configuration informations on a scalable video sequence.

These and other features, aspects and advantages of the present invention will become apparent from the following description, appended claims, and the accompanying exemplary embodiments shown in the drawings, which are briefly described below.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a diagram of a syntax structure for storing and marking a reference base picture according to an embodiment of the present invention;

FIG. 6 is a diagram of a syntax structure for storing and marking a reference base picture according to one embodiment of the present invention; and FIGS. 7 to 12 are diagrams of syntax structures for obtaining flag information indicating whether to store a current NAL unit in a buffer according to one embodiments of the present invention, respectively.

DETAILED DESCRIPTION OF PREFERRED EMBODIMENTS

Figure 1:
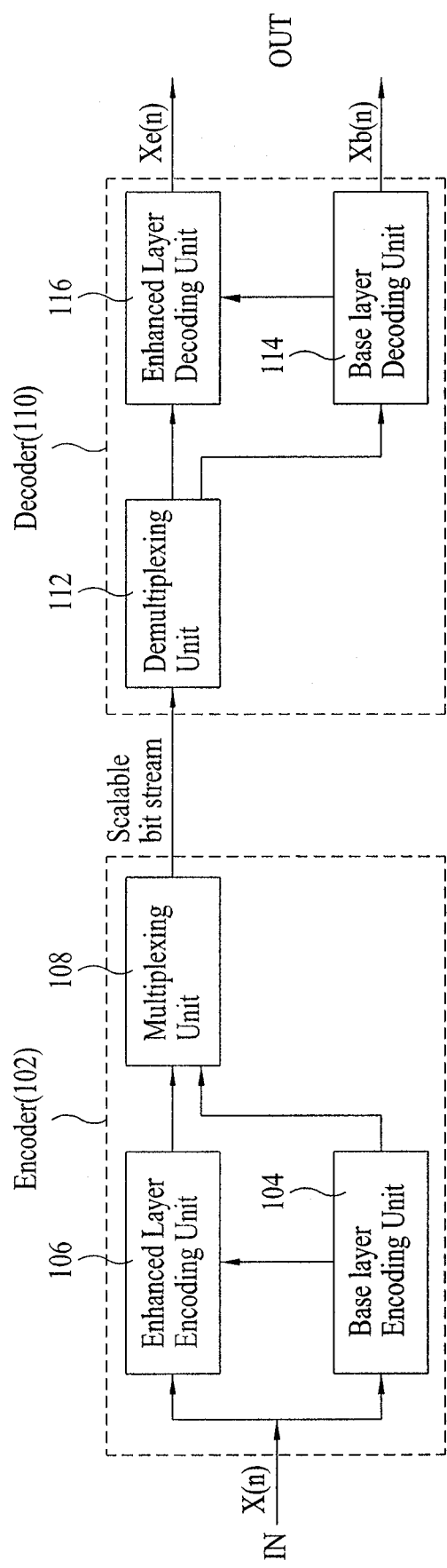
FIG. 1 is a schematic block diagram of a scalable video coding system according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of decoding a video signal according to the present invention includes determining whether to store a first partial picture when the first partial picture and a first full picture are corresponding to a first temporal point and storing the first partial picture for decoding a second full picture referring to the first partial picture, the second full picture being corresponding to a second temporal point, the second temporal point being located after the first temporal point, wherein a level of the first partial picture on a scalable domain is lower than a level of the second full picture on the scalable domain.

Preferably, the method further includes extracting flag information indicating whether to store a second partial picture corresponding to a decoded second full picture.

To further achieve these and other advantages and in accordance with the purpose of the present invention, a method of a video signal according to the present invention includes checking restriction flag information for restricting a specific syntax for codec compatibility, obtaining first flag information based on the restriction flag information, the first flag information indicating whether to store a reference base picture in a buffer and decoding the video signal using the reference base picture, the reference base picture being stored according to the first flag information.

To further achieve these and other advantages and in accordance with the purpose of the present invention, an apparatus for decoding a video signal according to the present invention includes an identification information checking unit checking restriction flag information for restricting a specific syntax for codec compatibility and a decoded picture buffer unit storing a base picture in a buffer based on first flag information, the first flag information indicating whether to store the reference base picture in the buffer, wherein the first flag information is obtained from a result of checking the restriction flag information.

It is to be understood that both the foregoing general description and the following detailed description are exemplary and explanatory and are intended to provide further explanation of the invention as claimed.

Reference will now be made in detail to the preferred embodiments of the present invention, examples of which are illustrated in the accompanying drawings.

First of all, compression coding of video signal data considers spatial redundancy, spatial redundancy, scalable redundancy, and inter-view redundancy. Compression coding scheme, which takes scalable redundancy into consideration, is just an embodiment of the present invention. And, the technical idea of the present invention is applicable to temporal redundancy, spatial redundancy, inter-view redundancy, and the like.

In the present disclosure, coding can include both concepts of encoding and decoding. And, coding can be flexibly interpreted to correspond to the technical idea and scope of the present invention.

In a bit sequence configuration of a video signal, there exists a separate layer structure called a NAL (network abstraction layer) between a VCL (video coding layer) dealing with a moving picture encoding process itself and a lower system that transports and stores encoded information. An output from an encoding process is VCL data and is mapped by NAL unit prior to transport or storage. Each NAL unit includes compressed video data or RBSP (raw byte sequence payload: result data of moving picture compression) that is the data corresponding to header information.

The NAL unit basically includes two parts, a NAL header and an RBSP. The NAL header includes flag information (nal_ref_idc) indicating whether a slice as a reference picture of the NAL unit is included and an identifier (nal_unit_type) indicating a type of the NAL unit. Compressed original data is stored in the RBSP. And, RBSP trailing bit is added to a last portion of the RBSP to represent a length of the RBSP as an 8-bit multiplication. As the type of the NAL unit, there is IDR (instantaneous decoding refresh) picture, SPS (sequence parameter set), PPS (picture parameter set), SEI (supplemental enhancement information), or the like.

So, if the information (nal_unit_type) indicating the type of the NAL unit indicates a scalable video coded slice, coding efficiency can be raised by adding various configuration informations relating to the scalable coding. For instance, it is able to add flag information indicating whether a current access unit is an instantaneous decoding refresh (hereinafter abbreviated IDR) access unit, dependency identification information indicating spatial scalability, quality identification information, flag information indicating whether a reference base picture is used as a reference picture, priority identification information, and the like. In order to manage a decoded picture buffer more efficiently, various configuration informations on the scalable coding are usable. This will be explained in detail with reference to FIG. 2 later.

In the standardization, requirements for various profiles and levels are set to enable implementation of a target product with an appropriate cost. In this case, a decoder should meet the requirements decided according to the corresponding profile and level. Thus, two concepts, 'profile' and 'level' are defined to indicate a function or parameter for representing how far the decoder can cope with a range of a compressed sequence. And, a profile identifier (profile_idc) can identify that a bit stream is based on a prescribed profile. The profile identifier means a flag indicating a profile on which a bit stream is based. For instance, in H.264/AVC, if a profile identifier is 66, it means that a bit stream is based on a baseline profile. If a profile identifier is 77, it means that a bit stream is based on a main profile. If a profile identifier is 88, it means that a bit stream is based on an extended profile. Moreover, the profile identifier can be included in a sequence parameter set.

So, in order to handle a scalable sequence, it needs to be identified whether an inputted bit stream is a profile for a scalable sequence. If the inputted bit stream is identified as a profile for a scalable sequence, it is necessary to add a syntax to enable at least one additional information for a scalable sequence to be transmitted. In this case, the profile for the scalable sequence indicates a profile mode for handling scalable video as an additional technique of H.264/AVC.

Since SVC is an additional scheme to conventional AVC, it may be more efficient to add a syntax as additional information for an SVC mode rather than to add a syntax unconditionally. For instance, when a profile identifier of AVC indicates a profile for a scalable sequence, if information on a scalable sequence is added, it is able to raise coding efficiency.

A sequence parameter set indicates header information containing information existing across coding of an overall sequence such as a profile, a level, and the like. A whole compressed moving picture, i.e., a sequence should begin at a sequence header. So, a sequence parameter set corresponding to header information should arrive at a decoder before data referring to the parameter set arrives. Namely, the sequence parameter set RBSP plays a role as the header information for the result data of the moving picture compression. Once a bit stream is inputted, a profile identifier preferentially identifies that the inputted bit stream is based on which one of a plurality of profiles.

Various embodiments to provide an efficient video signal decoding method are explained as follows.

FIG. 1 is a schematic block diagram of a scalable video coding system according to the present invention.

In order to provide a sequence optimized for various communication environments and various terminals, a sequence provided to a terminal should be diversified as well. If a sequence optimized for a terminal is provided to the corresponding terminal, it means that a single sequence source is prepared for a combination value of various parameters including a number of transmission frames per a second, resolution, a number of bits per a pixel, and the like. So, the optimized sequence imposes a burden on a contents provider.

Therefore, a contents provider encodes an original sequence into a compressed sequence data of high bit rate. In case of receiving a sequence request made by a terminal, the contents provider decodes the original sequence, encodes it into a sequence data suitable for a sequence processing capability of the terminal, and then provides the encoded data to the terminal. Since this transcoding is accompanied with the encoding-decoding-encoding process, a time delay is generated in providing a sequence. So, a complicated hardware device and algorithm are additionally required.

Scalable video coding (SVC) is a coding scheme for encoding a video signal with a best image quality to enable a partial sequence of a generated picture sequence to be represented as a sequence by being decoded. In this case, the partial sequence means a sequence consisting of frames intermittently selected from a whole sequence. For a picture sequence encoded by SVC, a sequence size can be reduced using spatial scalability on a low bit rate. And an image quality of sequence can be lowered using quality scalability as well. In this case, a picture sequence having a small screen and/or a low frame number per second can be called a base layer and a sequence having a relatively large screen and/or a relatively high frame number per second can be called an enhanced or enhancement layer.

A picture sequence encoded by the above-mentioned scalable scheme enables a sequence representation of a low image quality in a manner of receiving and processing the partial sequence only. If a bit rate is lowered, an image equality is considerably degraded.

To solve a problem of the degraded image quality, it is able to provide a separate auxiliary picture sequence for a low bit rate, e.g., a picture sequence having a small screen and/or a low frame number per second. Such an auxiliary sequence can be called a base layer and a main picture sequence can be called an enhanced or enhancement layer.

The scalable video coding system is explained in detail as follows.

First of all, the scalable coding system includes an encoder 102 and a decoder 110.

The encoder 102 includes a base layer encoding unit 104, an enhanced layer encoding unit 106, and a multiplexing unit 108. And, the decoder 110 can include a demultiplexing unit 112, a base layer decoding unit 114, and an enhanced layer decoding unit 116.

The base layer encoding unit 104 is capable of generating a base bit stream by compressing an inputted sequence signal X(n).

The enhanced layer encoding unit 106 is capable of generating an enhanced layer bit stream using the inputted sequence signal X(n) and information generated by the base layer encoding unit 104.

And, the multiplexing unit 108 is capable of generating a scalable bit stream using the base layer bit stream and the enhanced layer bit stream.

The generated scalable bit stream is transmitted to the decoder 110 via a prescribed channel. The transmitted scalable bit stream can be seperated into an enhanced layer bit stream and a base layer bit stream by the demultiplexing unit 112 of the decoder 110.

The base layer decoding unit 114 receives and decodes the base layer bit stream into an output sequence signal Xb(n).

The enhanced layer decoding unit 116 receives the enhanced layer bit stream and decodes the enhanced layer bit stream into an output sequence signal Xe(n) with reference to a signal reconstructed by the base layer decoding unit 114. In this case, the output sequence signal Xb(n) will be a sequence signal having an image quality or resolution lower than that of the latter output sequence signal Xe(n).

In scalable video coding, when a specific picture transmitted by having an enhanced layer encoded, an enhanced layer bit stream may be damaged in part in the course of a corresponding transmission. In this case, since the decoder 110 decodes the corresponding picture using the damaged enhanced layer bit stream, an original sequence may differ from a decoded sequence in a quality of image. Specifically, if a picture having such a problem is a reference picture needed to decode another picture with a lowest temporal level, the problem may get worse.

Hence, the picture having the lowest temporal level needs to be more efficiently managed. This will be explained in detail with reference to FIG. 3 and FIG. 4 later.

According to an embodiment of the present invention, a decoded picture buffer (DPB) enables scalable storage or marking of a full picture and a partial picture in scalable video coding. In this case, a full picture may mean a picture having a highest quality level and a partial picture may mean a picture having a lowest quality level. Alternatively, the full picture and the partial picture can be defined as indicating relatively high and low quality levels, respectively.

For instance, if a quality level is graded into 5 steps (0-4), a partial picture can belong to a case of the quality level 0 to 3. And, a full picture can belong to a case that the quality level is 4. Alternatively, a case of the quality level 0 can only correspond to a partial picture.

Meanwhile, a partial picture at a first temporal point needs to be stored in advance to be used as a reference picture. So, in order to decode a partial or full picture at a second temporal point after the first temporal point, the partial picture at the first temporal point can be used as the reference picture. And, the full or partial picture at the first temporal point can be adaptively used as the reference picture.

Figure 2:
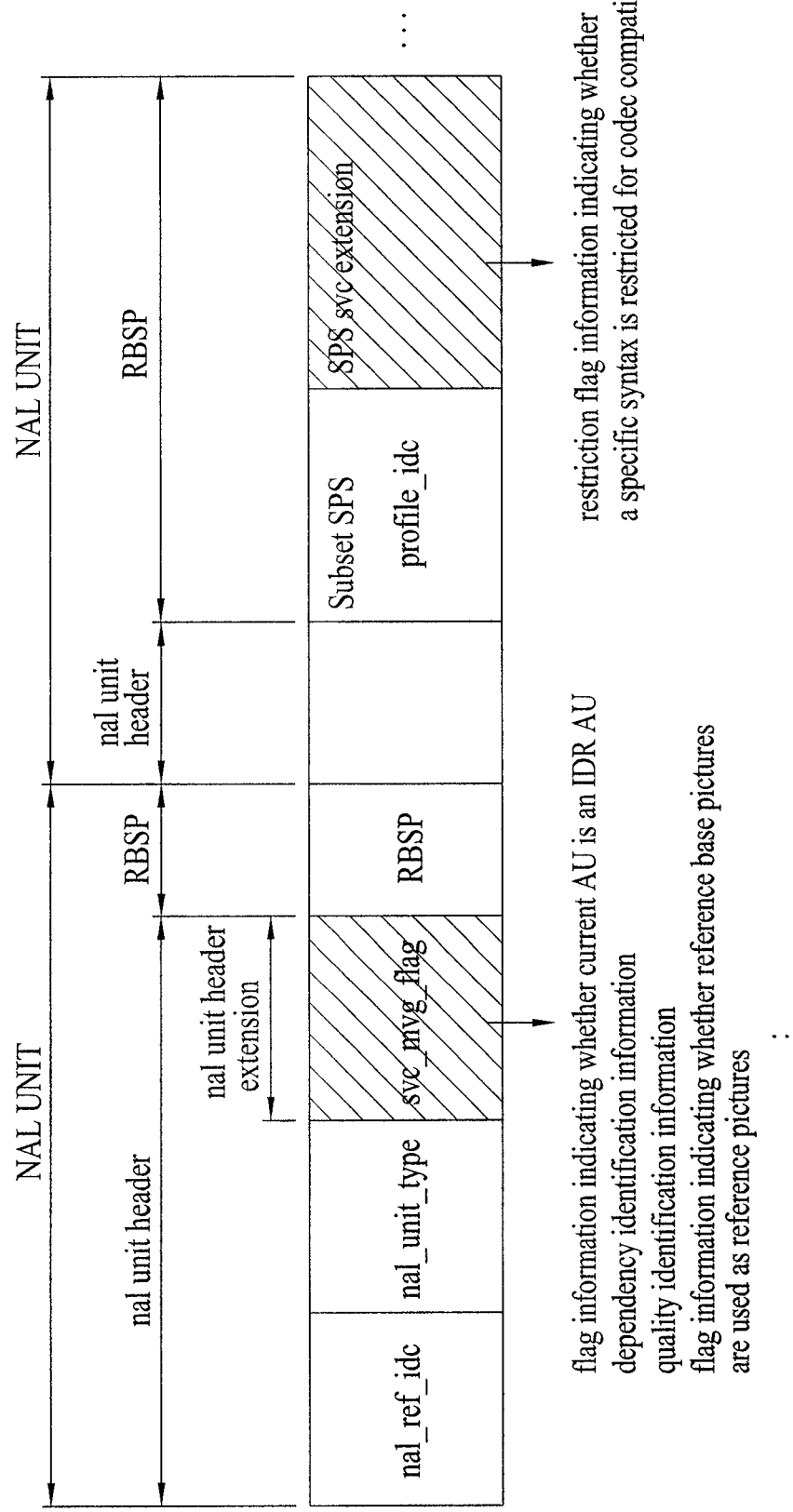
FIG. 2 is a diagram of configuration information for a scalable sequence addible to a scalable video coded bit stream according to an embodiment of the present invention.

FIG. 2 is a diagram of configuration information for a scalable sequence addible to a scalable video coded bit stream according to an embodiment of the present invention.

FIG. 2 shows an example of a structure of NAL unit enabling configuration informations on a scalable sequence to be added thereto.

The NAL unit may include a NAL unit header and a RBSP (raw byte sequence payload: result data of moving picture compression).

The NAL unit header can include identification information (nal_ref_idc) indicating whether the NAL unit includes a slice of a reference picture and information (nal_unit_type) indicating a type of the NAL unit.

And, an extension area of the NAL unit header can be limitedly included.

For instance, if the information indicating the type of the NAL unit is associated with scalable video coding or indicates a prefix NAL unit, the NAL unit is able to include an extension area of the NAL unit header. In particular, if the nal_unit_type=20 or 14, the NAL unit is able to include the extension area of the NAL unit header. And, configuration informations for a multi-view sequence can be added to the extension area of the NAL unit header according to flag information (svc_mvc_flag) capable of identifying whether it is SVC bit stream.

For another instance, if the information indicating the type of the NAL unit is information indicating a subset sequence parameter set, the RBSP can include information on the subset sequence parameter set. In particular, if nal_unit_type=15, the RBSP can include information on a subset sequence parameter set. In this case, the subset sequence parameter set can include an extension area of the sequence parameter set according to profile information. For example, if profile information (profile_idc) is a profile relevant to scalable video coding, the subset sequence parameter set can include an extension area of the sequence parameter set. Alternatively, a sequence parameter set can include an extension area of a sequence parameter set according to profile information. The extension area of the sequence parameter set can include restriction flag information for restricting a specific syntax for codec compatibility.

Various configuration informations on a scalable sequence, e.g., configuration informations that can be included in an extension area of NAL unit header or configuration informations that can be included in an extension area of a sequence parameter set are explained in detail as follows.

Figure 3:
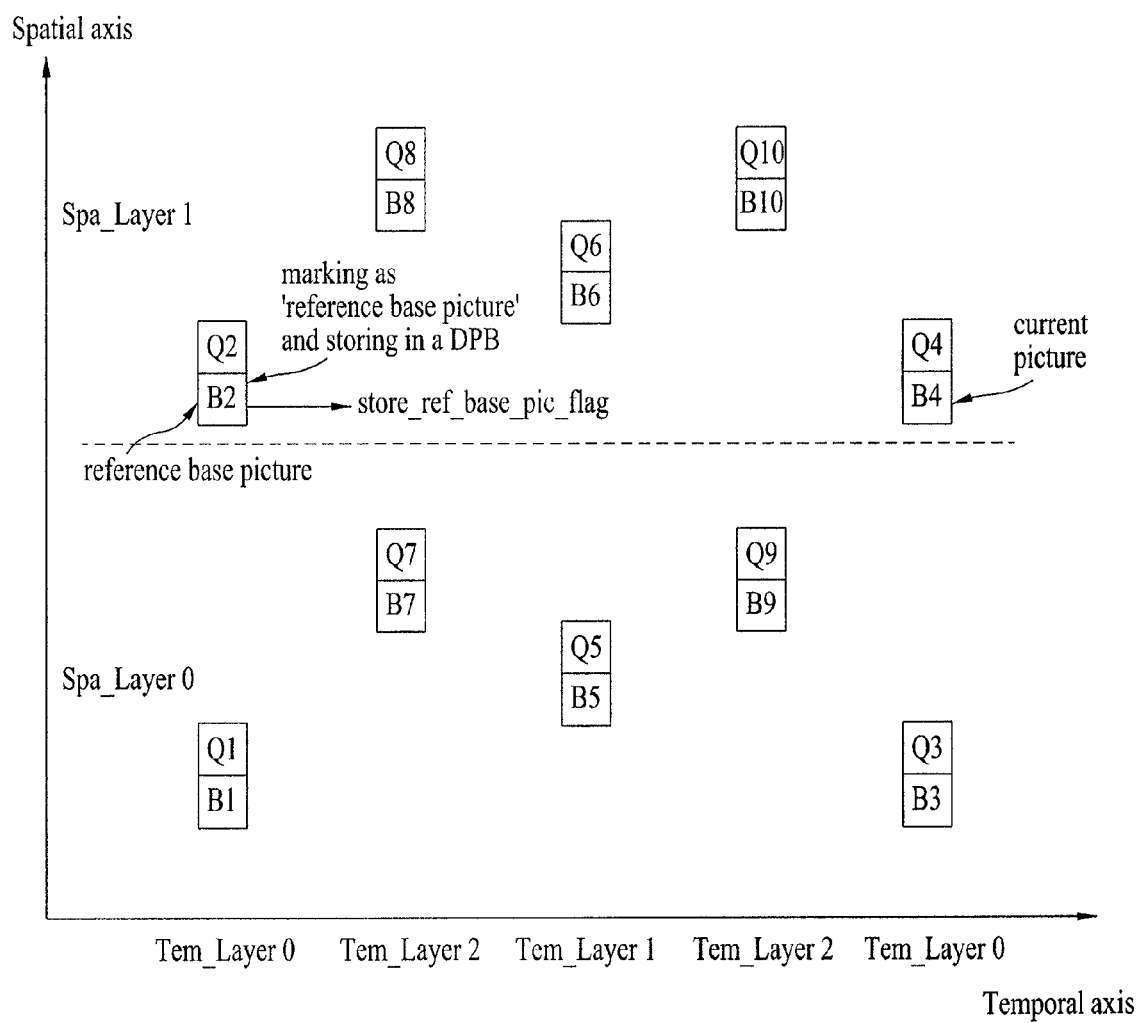
FIG. 3 is a diagram of various scalability structures of scalable video coding to explain a process for storing and using a reference base picture according to an embodiment of the present invention.

First of all, identification information indicating spatial scalability means information identifying dependency on NAL unit. For instance, the dependency may vary in accordance with spatial resolution. In FIG. 3, pictures in Spa_Layer0 and Spa_Layer1 can have the same resolution. Pictures in Spa_Layer0 can include pictures obtained by performing downsampling on pictures in Spa_Layer1.

In particular, assuming that information identifying dependency on NAL unit is named dependency_id, pictures in Spa_Layer0 may have the relation of dependency_id=0. And, pictures in Spa_Layer1 may have the relation of dependency_id=1.

The dependency identification information can be defined in various ways. Thus, NAL units having the same value as the information identifying the dependency can be represented as dependency representation.

Quality identification information means information identifying a quality for NAL unit. For instance, a single picture can be coded into pictures differing in quality. In FIG. 3, pictures in Spa_Layer0 and Spa_Layer1 can be coded into pictures differing from each other in quality.

In particular, assuming that information identifying a quality for the NAL unit is named quality_id, pictures B1, B2, ..., B10 can be set to quality_id=0. And, pictures Q1, Q2, Q10 can be set to quality_id=1. Namely, the pictures B1, B2, ..., B10 may mean the pictures having the lowest image quality. These are called base pictures. The pictures Q1, Q2, ..., Q10 may include the pictures 131, B2, ..., B10 and have an image qualities better than the pictures B1, B2, ..., B10. And, the quality identification information can be defined in various ways. For instance, the quality identification information can be represented as 16 steps.

Meanwhile, a single layer can be defined in accordance with the information identifying the dependency and the quality identification information. In this case, NAL units having the same values as the information identifying the dependency and the quality identification information can be represented as layer representation.

Identification information indicating temporal scalability means information identifying a temporal level for NAL unit. The temporal level can be explained in a hierarchical B picture structure.

For instance, a picture (B1, Q1) and a picture (B3, Q3) in Spa_Layer0 can have an identical temporal level Tem_Layer0. If a picture (B5, Q5) refers to a picture (B1, Q1) and a picture (B3, Q3), the picture (B5, Q5) can have a temporal level Tem_Layer1 higher than a temporal level Tem_Layer0 of the picture (B1, Q1) or the picture (B3, Q3). Likewise, if a picture (B7, Q7) refers to a picture (B1, Q1) and a picture (B5, Q5), the picture (B7, Q7) can have a temporal level Tem_Layer2 higher than a temporal level Tem_Layer1 of the picture (B5, Q5). All the NAL units within a single access unit can have an identical temporal level value. In case of an IDR access unit, the temporal level value may become 0.

Flag information indicating whether a reference base picture is used as a reference picture indicates whether the reference base picture is used as reference picture in an inter-prediction process or whether a decoded picture is used as reference picture. The flag information can have the same value for NAL units in a same layer, i.e., for NAL units having the same information identifying dependency.

Priority identification information means information identifying a priority of NAL unit. It is able to provide inter-layer extensibility or inter-picture extensibility using the priority identification information. For instance, it is able to provide a user with sequences at various temporal and spatial levels using the priority identification information. So, the user is able to view a sequence in specific time and space or a view in accordance with a different restriction condition only.

The priority information can be configured in various ways in accordance with its reference condition. The priority information can be randomly configured without taking a special reference. And, the priority information can be determined by a decoder.

And, configuration information inclusive in an extension area of NAL unit header can include flag information indicating whether a current access unit is an IDR access unit.

FIG. 3 is a diagram of various scalability structures of scalable video coding to explain a process for storing and using a reference base picture according to an embodiment of the present invention.

First of all, in temporal scalability, a layer of a video sequence can be decided in accordance with a frame rate.

Referring to FIG. 3, if it goes upward in each layer, it means a higher temporal scalable layer to indicate that a frame rate gets higher.

Temporal scalable video coding can be implemented by applying a concept of a hierarchical B picture or a hierarchical P picture to H.264 video coding. For instance, in case of predicting picture (B5, Q5) belonging to a temporal level Tem_Layer1, pictures (B7, Q7, B9, Q9) belonging to a temporal level Tem_Layer2 having a value greater than the temporal level Tem_Layer1 are unusable as reference pictures. Yet, pictures (B1, Q1, B3, Q3) belonging to Tem_Layer0 having a low temporal level are usable as reference pictures.

Hence, a picture belonging to a random temporal layer can be independently decoded regardless of a presence or non-presence of decoding of a picture belonging to a layer higher than the random temporal layer. If a decodable level is determined in accordance with a capability of a decoder, it is able to decode a H.264 compatible video signal at a corresponding frame rate.

Spatial scalability in FIG. 3 is explained as follows. Pictures in Spa_Layer0 and Spa_Layer1 can have identical resolutions, respectively. Pictures in Spa_Layer0 can be pictures obtained from performing downsampling on pictures in Spa Layel. For instance, if information identifying dependency on NAL unit is set to dependency_id, pictures in Spa_Layer0 can be set to dependency_id=0 and pictures in Spa_Layer1 can be set to dependency_id=1.

Quality scalability is explained as follows. Pictures in each layer on a spatial axis can have pictures differing from each other in quality. For instance, assuming that information identifying a quality for NAL unit is set to quality_id, pictures B1, B2, . . . , B10 can be set to quality_id=0 and pictures Q1, Q2, . . . , Q10 can be set to quality_id=1. In particular, the pictures B1, B2, . . . , B10 may mean pictures having a lowest image quality. On the contrary, the pictures Q1, Q2, . . . , Q10 correspond to pictures having an image quality better than the pictures B1, B2, . . . , B10. The quality identification information can be defined in various ways. For instance, the quality identification information can be represented as 16 steps.

A process for storing a reference base picture and using the stored reference base picture for decoding according to an embodiment of the present invention is explained as follows.

With reference to pictures shown in FIG. 3, a decoding order can be set to B1, Q1, B2, Q2, B3, Q3, . . . , B10, Q10 (1→2→3→4→4→ . . . , →9→10). If a picture to be currently decoded is B4, The pictures B1, Q1, B2, Q2, B3 and Q3 are pictures decoded in advance. The picture B4 corresponds to a picture having a lowest temporal level and a lowest quality level. The picture B4 is able to refer to the picture B2 that is a base picture. So, the picture B2 should be stored in a decoded picture buffer.

In this case, in case of decoding the picture B2 which has been already decoded, flag information indicating whether the picture B2 is going to be stored in the decoded picture buffer for a picture (e.g., picture B4) to be coded later. For instance, in case that a current NAL unit corresponds to a reference base picture, it is able to define flag information indicating whether to store the current NAL unit in a buffer as store_ref_base_pic_flag. And, a marking indicating that the picture B2 is going to be referred to as a base picture may be needed. So, the decoded picture buffer can mark the picture B2 as a reference base picture after the picture B2 decoding. After completion of theses steps, in case of decoding the picture B4, the picture B4 can utilize the picture B2, which is stored in the decoded picture buffer and marked as the reference base picture, as a reference picture in accordance with store_ref_base_pic_flag.

According to another embodiment of the present invention, in case that a current NAL unit corresponds to a lowest quality level and includes a slice of a reference picture, a process for obtaining flag information indicating whether to store the current NAL unit in a buffer is explained as follows.

For instance, the flag information may be a syntax element for a scalable video coded bit stream only. So, another information capable of restricting the flag information may be required for codec compatibility. Alternatively, another information capable of restricting the flag information may be required for facilitating a bit stream format to be transformed. For instance, it is able to define flag information for rewriting a scalable video coded bit stream for codec compatibility.

For compatibility with a previous codec, for example, in case that a scalable video coded bit stream is decoded by AVC codec, it is necessary to rewrite the scalable video coded bit stream into an AVC bit stream. In doing so, the restriction flag information is able to restrict syntax information applied to the scalable video coded bit stream only. By restricting it, is able to transform the scalable video coded bit stream into the AVC bit stream using a simple transformation process. For instance, it can be represented as slice_header_restriction_flag. The restriction flag information can be obtained from a sequence parameter set or a subset sequence parameter set. Alternatively, the restriction flag information can be obtained from an extension area of a subset sequence parameter set.

It is able to restrict a syntax element used for a specific codec only. For instance, in case that a current NAL unit corresponds to a lowest quality level and includes a slice of a reference picture, it is able to restrict the flag information indicating whether to store the current NAL unit in a buffer, at a slice header using the restriction flag information. In particular, only if slice_header_restriction_flag=0, it is able to obtain store_ref_base_pic_flag information. If slice_header_restriction_flag=1, it is unable to obtain store_ref_base_pic_flag information. This plays a role in equalizing a slice header of a scalable video coded bit stream to a header of an AVC bit stream to enable decoding by AVC codec.

Figure 4:
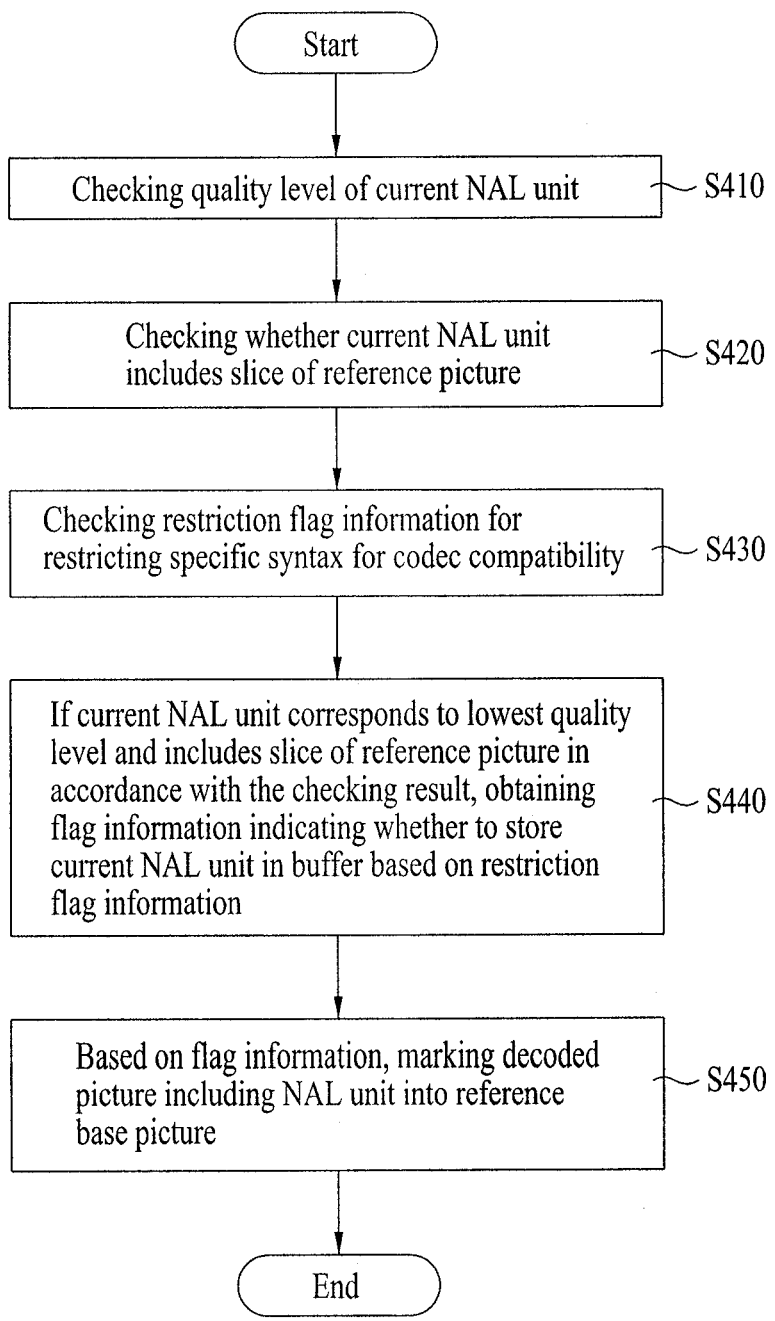
FIG. 4 is a flowchart of a process for storing a reference base picture according to an embodiment of the present invention.

FIG. 4 is a flowchart of a process for storing a reference base picture according to an embodiment of the present invention.

First of all, FIG. 3 is used in the following description. In case of attempting to decode a picture B4 which corresponds to a current picture, the picture B4 corresponds to a picture having a lowest temporal level and a lowest quality level. Namely, the picture B4 can correspond to a base picture represented by base representation. So, the picture B4 is able to refer to a picture B2 as a base picture. In order to refer to the picture B2, it is necessary to store the picture B2 in a decoded picture buffer in advance.

A process for storing the picture B2 in a decoded picture buffer to use the picture B2 as a reference picture is explained in the following description.

In decoding a picture B2, it is able to obtain quality identification information from an extension area of a current NAL unit header. In case that the quality identification information indicates a lowest value, as mentioned in the foregoing description of FIG. 2, a current NAL unit of a picture B2 can correspond to a base picture. So, it is necessary to check whether the current NAL unit of the picture B2 corresponds to the base picture in accordance with the obtained quality identification information (S410).

Since the picture B2 will be used as a reference picture, this can be informed by a header of the NAL unit. For instance, it is able to obtain identification information (nal_ref_idc) indicating whether a current NAL unit includes a slice of a reference picture. In accordance with the identification information, it is necessary to check whether the current NAL unit of the picture B2 includes the slice of the reference picture (S420). In case that the current NAL unit is the base picture and includes the slice of the reference picture in accordance with the identification informations, the current NAL unit can correspond to a reference base picture.

Thus, if the current NAL unit corresponds to the lowest quality level and includes the slice of the reference picture, a reference picture marking process is executed. The reference base picture can be additionally marked as a reference base picture in a picture marking process of a decoded picture buffer. In this case, it is able to obtain flag information indicating whether to store the reference base picture or not. In order to obtain this flag information, there should be not other flag information that restricts this flag information. For instance, it is necessary to check restriction flag information that restricts a specific syntax for codec compatibility (S430).

The flag information may be the information obtained from an extension area of a subset sequence parameter set. In particular, let's assume that restriction flag information for rewriting a scalable video coded bit stream into an AVC bit stream for codec compatibility is slice_header_restriction_flag. Using the restriction flag information, it is able to represent whether a specific syntax referring to a sequence parameter set exists within a slice header. Based on the restriction flag information, it is able to obtain flag information indicating whether to store the current NAL unit in a buffer (S440).

If the current NAL unit is stored in accordance with the flag information indicating whether to store the current NAL unit in the buffer, and if the current NAL unit is not an IDR picture, a process for marking a reference picture of a decoded base layer can be executed.

If the current NAL unit is stored in accordance with the flag information indicating whether to store the current NAL unit in the buffer, and if a decoded picture including the stored NAL unit is marked as a reference base picture, it is able to decode a video signal using the reference base picture (S450). For instance, if the picture B2 is stored in accordance with the flag information and marked as the reference base picture, it is able to use the picture B2 as the reference picture in decoding the picture B4 that is a current picture.

FIG. 5 is a diagram of a syntax structure for storing and marking a reference base picture according to an embodiment of the present invention.

FIG. 5 shows an example of a syntax structure for a technical idea of the explained flowchart in FIG. 4.

First of all, it is necessary to check whether a current NAL unit corresponds to a base picture in accordance with quality identification information in a slice header (S510).

In accordance with identification information nal_ref_idc indicating whether the current NAL unit includes a slice of a reference picture, it is necessary to check whether the current NAL unit includes a slice of a reference picture (S520).

If the current NAL unit is the base picture and includes the slice of the reference picture, the current NAL unit can correspond to a reference base picture. Thus, in case that the current NAL unit corresponds to the reference base picture, a reference picture marking process is executed (S530). The reference base picture can be marked additionally as a reference base picture in a picture marking process of a decoded picture buffer.

In this case, it is able to obtain flag information indicating whether to store the reference base picture. To obtain the flag information, it is necessary to check restriction flag information for restricting a specific syntax for codec compatibility (S540).

The flag information can be the information obtained from an extension area of a subset sequence parameter set. For instance, restriction flag information for rewriting a scalable video coded bit stream into an AVC bit stream for codec compatibility can be set to slice_header_restriction_flag. By the restriction flag information, it is able to represent whether a specific syntax referring to a sequence parameter set exists in a slice header.

In accordance with the restriction flag information, it is able to obtain flag information indicating whether to store the reference base picture (S550).

If the reference base picture is stored in accordance with the flag information indicating whether to store the reference base picture and if the reference base picture is not an IDR picture (S560), a process for marking a reference picture of a decoded base layer can be executed (S570).

Alternatively, it is able to check flag information indicating whether the reference base picture is used as a reference picture in an inter-prediction process or a decoded picture is used as a reference picture. As a result of the check, if the reference base picture is used as the reference picture and if the reference base picture is not the IDR picture (S560), a process for marking a reference picture of a decoded base layer can be executed (S570).

FIG. 6 is a diagram of a syntax structure for storing and marking a reference base picture according to one embodiment of the present invention.

In processing a signal by NAL unit, another NAL unit preceding a current NAL unit is usable. This is called 'prefix NAL'.

The prefix NAL is usable to deliver information, which is applied to SVC only to a base layer and maintains compatibility between a base layer bit stream and an AVC codec.

For instance, flag information indicating whether to store a reference base picture explained in FIG. 5 can be included in the prefix NAL. In particular, in accordance with identification information nal_ref_idc indicating whether a current NAL unit includes a slice of a reference picture, it is necessary to check whether a current NAL unit includes a slice of a reference picture. If the current NAL unit includes the slice of the reference picture in accordance with the identification information, flag information indicating whether to store a reference base picture can be obtained.

In accordance with the flag information indicating whether to store a reference base picture, if the reference base picture is stored and if the reference picture is not an IDR picture, a process for marking a reference picture of a decoded base layer can be executed.

Alternatively, it is able to check flag information indicating whether the reference base picture is used as a reference picture in an inter-prediction process or a decoded picture is used as a reference picture. As a result of the check, if the reference base picture is used as the reference picture and if the reference base picture is not the IDR picture, a process for marking a reference picture of a decoded base layer can be executed.

FIGS. 7 to 12 are diagrams of syntax structures for obtaining flag information indicating whether to store a current NAL unit in a buffer according to one embodiments of the present invention, respectively.

In an embodiment shown in FIG. 7, flag information to store a reference base picture can be defined as store_base_rep_flag. The flag information can be obtained from a slice header (S710).

A predetermined condition can be given to obtain the flag information. For instance, there is a case that slice type is not PR. Namely, it is not a case of a slice type indicating an enhanced quality level, which can be called a case that a quality level is lowest.

And, it is able to check information indicating whether to restrict a specific syntax of a current slice for codec compatibility. For instance, it is able to check another information capable of restricting the flag information to facilitate a format of a bit stream to be transformed.

Moreover, it is able to define flag information for rewriting a scalable video coded bit stream for codec compatibility.

As mentioned in the foregoing description, if the slice type is not the PR and if it is not restricted by the flag information, the flag information for storing a reference base picture can be obtained.

In an embodiment shown in FIG. 8, it is able to define another flag information to obtain flag information indicating whether to store a current NAL unit in a buffer. For instance, it is able to define flag information indicating whether a reference base picture is used as a reference picture. The flag information indicates whether reference base pictures are used as reference pictures in the course of inter-prediction or decoded pictures are used as reference pictures. The flag information can have an identical value for NAL units having the same information for identifying dependency. And, it is able to define the flag information in an extension area of a NAL unit header (S810).

It is able to check whether a current slice corresponds to a base layer and has a lowest quality level (S820).

It is able to check whether a current slice is used as a reference picture (S830).

It is able to check whether a reference base picture is used as a reference picture (S840). If the reference base picture is used as the reference picture, it is able to obtain flag information indicating whether to store a current NAL unit in a buffer (S850).

After the current NAL unit has been stored in the buffer, if a type of the NAL unit is associated with SVC (S860), a process for marking a decoded picture including the current NAL unit as a reference base picture can be executed (S870).

It is able to obtain flag information indicating whether to store a current NAL unit in a buffer on a prescribed condition from a slice header. For instance, if a slice type indicates a slice at an enhanced quality level, if the slice type corresponds to a first portion in case of dividing a quality layer, and if a reference base picture is used as a reference picture (S880), it is able to obtain flag information indicating whether to store the NAL unit in the buffer (S890).

In an embodiment shown in FIG. 9, flag information (S930) indicating whether to store a current NAL unit in a buffer can be defined in a different manner. For instance, the flag information can be defined in an extension area of a NAL unit header together with another flag information (S910) indicating whether a reference base picture is used as a reference picture.

In an embodiment shown in FIG. 10, flag information indicating whether to store a current NAL unit in a buffer can be obtained using another flag information. For instance, it is able to define flag information indicating whether a reference base picture is used as a reference picture. The flag information can be defined in an extension area of NAL unit header (S1010).

It is able to check whether a current slice corresponds to a base layer and a quality level of the current slice is lowest (S1020).

It is able to check whether the current slice is used as the reference picture (S1030).

Flag information indicating whether to store a current NAL unit is a buffer can be then obtained if the current slice is used as the reference picture (S1040).

If the current NAL unit is stored in the buffer and a type of the current NAL unit is associated with SVC (S1050), it is able to execute a process for marking a decoded picture including the current NAL unit into a reference base picture (S1060).

It is able to obtain flag information indicating whether to store a current NAL unit in a buffer on a predetermined condition from a slice header as well. For instance, if a slice type does not correspond to a slice at an enhanced quality level, and a specific syntax of a current slice is not restricted for codec compatibility, and a reference base picture is used as a reference picture (S1070), it is able to obtain flag information indicating whether to store a current NAL unit in a buffer (S1080).

In an embodiment shown in FIG. 11, flag information indicating-whether to store a current NAL unit in a buffer can be obtained using another flag information. For instance, it is able to use flag information indicating whether a reference base picture is used as a reference picture.

For instance, if a slice type does not correspond to a slice at an enhanced quality level and a reference base picture is used as a reference picture, it is able to obtain flag information indicating whether to store a current NAL unit in a buffer (a).

If a reference base picture is used as a reference picture without restricting a specific syntax of a current slice for codec compatibility, it is able to obtain flag information indicating whether to store a current NAL unit in a buffer (b).

After checking whether a reference base picture is used as a reference picture, it is able to obtain flag information indicating whether to store a current NAL unit in a buffer (c).

In an embodiment shown in FIG. 12, flag information indicating whether to store a current NAL unit in a buffer can be obtained using another flag information.

For instance, if a slice type indicates a slice at an enhanced quality level, it is able to check whether it corresponds to a first portion if a quality layer is divided (S1210).

It is able to check whether a reference base picture is used as a reference picture or whether a quality level of a current slice indicates a first enhanced quality level (S1230).

So, it is able to obtain flag information indicating whether to store a current NAL unit in a buffer (S1250).

As mentioned in the foregoing description, the decoder/encoder according to the present invention is provided to a broadcast transmitter/receiver for multimedia broadcasting such as DMB (digital multimedia broadcasting) to be used in decoding video signal, data signals, etc. And, the multimedia broadcast transmitter/receiver can include a mobile communication terminal.

A decoding/encoding method, to which the present invention is applied, is configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording media include ROM, RAM, CD-ROM, magnetic tapes, floppy discs, optical data storage devices, etc. and also includes a device implemented with carrier waves (e.g., transmission via internet). And, a bit stream generated by the encoding method is stored in a computer-readable recording medium or transmitted via wire/wireless communication network.

Accordingly, while the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of decoding a scalable video coded bitstream comprising:

receiving the scalable video coded bitstream including a quality base layer and an enhanced layer;

checking restriction flag information for specifying a presence of a specific syntax for codec compatibility;

obtaining first identification information from the scalable video coded bitstream based on the restriction flag information, the first identification information indicating whether to store a quality base picture as a reference picture in a buffer;

checking reference identification information specifying whether or not the quality base picture is used as a reference base picture;

marking the quality base picture as the reference picture and as a reference base picture when the reference base picture is stored according to the first identification information, the reference base picture being used for identifying the quality base picture, wherein the quality base picture is marked as the reference base picture when the reference identification information indicates the quality base picture is used as the reference base picture, and the first identification information indicates to store the quality base picture as the reference picture; and decoding an enhanced picture of the enhanced layer using the quality base picture marked as the reference picture and the reference base picture.

2. The method of claim 1, further comprising:
obtaining second identification information indicating whether the reference base picture is used as the reference picture.

3. The method of claim 1, wherein the restriction flag information is obtained from an extension area of a sequence parameter set.

4. The method of claim 1, wherein the first identification information is obtained from a slice header.

5. The method of claim 1, wherein the first information is obtained from raw byte sequence payload (RBSP) of a network abstraction layer (NAL) unit preceding the current NAL unit.

6. The method of claim 1, wherein the scalable video coded bitstream is received as a broadcasting signal.

7. The method of claim 1, wherein the scalable video coded bitstream is received via a digital medium.

8. A non-transitory computer readable medium, in which a program for executing the method of claim 1 is recorded, the medium configured to be read by a computer.

9. An apparatus for decoding a scalable video coded bitstream, comprising:
a physical decoding unit configured to,
receive a scalable video coded bitstream including a quality base layer and an enhanced layer,
check restriction flag information for specifying a presence of a specific syntax for codec compatibility,
obtain first identification information from the scalable video coded bitstream based on the restriction flag information, the first identification information indicating whether to store a quality base picture as a reference picture in a buffer,
check reference identification information specifying whether or not the quality base picture is used as a reference base picture,
mark the quality base picture as the reference picture and as a reference base picture when the reference base picture is stored according to the first identification information, the reference base picture being used for identifying the quality base picture, wherein the quality base picture is marked as the reference base picture when the reference identification information indicates the quality base picture is used as the reference base picture, and the first identification information indicates to store the quality base picture as the reference picture, and
decode an enhanced picture of the enhanced layer using the quality base picture marked as the reference picture and the reference base picture.

10. The apparatus of claim 9, wherein the physical decoding unit obtains second identification information indicating whether the reference base picture is used as the reference picture.

* * * * *